United States Patent
Squarzi

(10) Patent No.: US 12,115,952 B2
(45) Date of Patent: Oct. 15, 2024

(54) VEHICLE BRAKE

(71) Applicant: Heritage Srl, Faenza (IT)

(72) Inventor: Marco Squarzi, Forlì (IT)

(*) Notice: Subject to any disclaimer, the term of this patent is extended or adjusted under 35 U.S.C. 154(b) by 864 days.

(21) Appl. No.: 17/250,273

(22) PCT Filed: Jun. 25, 2019

(86) PCT No.: PCT/IB2019/055331
§ 371 (c)(1),
(2) Date: Dec. 23, 2020

(87) PCT Pub. No.: WO2020/003112
PCT Pub. Date: Jan. 2, 2020

(65) Prior Publication Data
US 2021/0268996 A1    Sep. 2, 2021

(30) Foreign Application Priority Data
Jun. 26, 2018  (IT) .................. 102018000006685

(51) Int. Cl.
*B60T 1/06*     (2006.01)
*B60B 27/00*    (2006.01)
*F16D 65/092*   (2006.01)
*F16D 65/12*    (2006.01)
*F16D 65/18*    (2006.01)
(Continued)

(52) U.S. Cl.
CPC .......... *B60T 1/065* (2013.01); *B60B 27/0052* (2013.01); *F16D 65/092* (2013.01); *F16D 65/123* (2013.01); *F16D 65/18* (2013.01); *F16D 65/847* (2013.01); *F16D 65/128* (2013.01); *F16D 2065/1384* (2013.01);
(Continued)

(58) Field of Classification Search
CPC .......... B60T 5/00; B60T 1/065; F16D 65/092; F16D 65/18; F16D 65/123; F16D 65/128; F16D 65/847; F16D 2065/1384; B60B 27/0052
See application file for complete search history.

(56) References Cited

U.S. PATENT DOCUMENTS

| | | | | |
|---|---|---|---|---|
| 4,250,979 A | * | 2/1981 | Kawaguchi | ........... F16D 65/123 188/71.6 |
| 4,550,809 A | * | 11/1985 | Kawaguchi | ........... F16D 65/123 188/71.6 |
| 4,596,312 A | * | 6/1986 | Kawaguchi | ............... B62L 1/00 188/71.6 |

FOREIGN PATENT DOCUMENTS

| | | |
|---|---|---|
| FR | 2260028 | 8/1975 |
| FR | 2421306 | 10/1979 |
| GB | 1426955 | 3/1976 |

* cited by examiner

*Primary Examiner* — Vishal R Sahni
(74) *Attorney, Agent, or Firm* — Themis Law

(57) ABSTRACT

A vehicle brake includes a disk that is rotationally integral with a central drum of a wheel, which is rotatingly supported on a shaft and forms a half-shell of a two half-shell housing compartment. A cover half-shell is provided opposite the central drum and is rotatingly unsupported with respect to the central drum, and has a braking element compressible by a pushing member against the facing surface of the disk. The disk includes a crown of teeth or radial ribs engaging a concentric crown of recesses on the central drum, which has a backing surface of at least part of the radial teeth or ribs and at least part of the face of the disk facing the drum. The backing surface provides the countercheck of the disk against the compressing action of a braking element against the surface of the opposite disk face.

11 Claims, 11 Drawing Sheets

(51) Int. Cl.
 *F16D 65/847* (2006.01)
 *F16D 65/02* (2006.01)
 *F16D 121/04* (2012.01)
(52) U.S. Cl.
 CPC .. *F16D 2121/04* (2013.01); *F16D 2200/0013* (2013.01); *F16D 2200/0021* (2013.01)

VEHICLE BRAKE

The present invention relates to a hydraulic brake for vehicles, preferably designed for motorbikes provided with drum type brakes and in particular for vintage motorbikes.

Such a brake is known in the state of the art that combines the aesthetical appearances of a drum brake typical of those years with the higher performances of a modern brake and, specifically, a hydraulically operated double disk brake. This brake according to known art is designed so as to have two disks that, applied to the two opposite faces of a drum centrally keyed to the wheel, are braked and stopped by the action of a plurality of braking elements or "brake pads" hydraulically operated for acting against two disks on both sides of the drum. The brake is provided with eccentric gyroscopic masses proper of the conventional disk brakes, that negatively affect the motorbike holding mostly when braking on corner or wet surfaces.

This known brake solves the problem generally, but still has some drawbacks that result in unfavorable conditions.

In particular according to a first aspect the brake according to known art is subjected to excessive heating that results in a possible reduction or loss of braking efficacy.

According to still a further aspect, the known brake has mechanical dimensioning of the drum and hub part still unfavorable and little strong.

According to yet a further aspect it is disadvantageous that the braking disk is constrained to the hub part by means of bolts and that therefore the braking energy is completely discharged on the disk fastening bolts, whereby in case of failure there is not a safety condition adequate to ensure the brake functionality.

In the document U.S. Pat. No. 4,596,312, the braking disk is held in position on the hub, by means of axial tightening in the direction of the rotation axis thanks to tightening means coinciding with the bolts fastening the wheel rim. A similar construction is known from document U.S. Pat. No. 4,550,809.

The British Patent Application GB1,426,995 shows a braking device for a motorbike wheel wherein the disk is rotationally integral with the drum by being fastened to the same by means of a bolt crown.

The three documents show braking clamps operating on the two faces of the disk as braking members and are standalone members of the drum or rim.

In respect of the afore said aspects, the invention provides a vehicle brake comprising at least one disk which is rotationally integral with a central drum of a wheel, the central drum being rotatingly supported on a shaft. The central drum forms, for said at least one disk, a half-shell of a housing compartment composed of two half-shells separated from one another along a plane parallel to the plane subtended by said disk, while the closing half-shell is provided on the side of the disk opposite to the drum and closes said compartment on the disk side opposite said drum, said closing half-shell being provided with at least one braking element compressible by at least one hydraulically operated pushing system or member against the facing surface of the disk by means of the operation of a braking control member, the closing half-shell being not rotatingly supported with respect to the central drum.

According to the invention, said disk comprises a crown of teeth or radial ribs engaging a concentric crown of radial engaging recesses on said central drum and said central drum comprises a backing surface of at least part of said radial ribs and at least part of the face of the disk facing said drum, the backing surface constituting the countercheck of the disk against the compressing action of at least one braking element against the surface of the opposite face of the disk.

As it is apparent, the disk is only housed in a hole shaped for example as in the arrangement described with a matching combination of teeth on both the disk peripheral edge and the relative surface.

It is also apparent that the disk tightening for the braking occurs between two fastening members of which a first element acting as a countercheck is made of the rim surface itself resting against the disk face, whereas the other element consists of a presser that is mounted on a removable cover.

According to an embodiment, the closing half-shell carries at least three braking members which are arranged angularly at an equal distance from one another in reference to the disk symmetry axis, a separate compressing member being combined with each braking element.

According to a further characteristic, the compressing members are serially connected and in succession one to another such to receive the pressure fluid in temporal succession one to another.

According to a further characteristic, the cover half-shell is internally provided with at least three cylindrical chambers intended to house internally as many brake pads of friction material or braking elements and a pushing actuator plunger, while a suitable duct connects a brake oil reservoir with one of the three chambers of each cover.

Yet still according to a further characteristic, the last pushing member, i.e., the last cylindrical chamber to which the oil is fed at breaking is the member positioned lower down in reference to the condition of normal use of the wheel is the last one of the three pushing members receiving the operation oil and is provided with an air venting opening.

According to yet a characteristic, the central drum is rotatably mounted with the interposition of at least one bearing on a stationary central hub intended to be stationary supported on a shaft, while the cover half-shell or half-shells are fastened to said central hub such not to be rotatable around the rotation axis of the central drum and rotationally unconstrained from said drum.

According to an embodiment, the central drum carries a substantially identical disk on each of its faces, the central drum being made symmetrical with respect to a central plane perpendicular to the rotation axis, a housing compartment for the corresponding disk being provided on each face of said central drum closed outwardly by an identical closing half-shell.

Advantageously the two cover half-shells are made symmetrical to one another with respect to said central plane perpendicular to the rotation axis of the central drum.

From what above it is apparent that the rotary coupling between disk and wheel takes place by means of a shape coupling thanks to the mutual engagement of protrusions or radial ribs with engaging recesses or notches respectively on the disk or disks and on the central drum. In this case, therefore the braking energy is not discharged onto pins or bolts that constrain the or each disk to the central drum and that are therefore subjected to very strong shear forces with a high danger of failure, but onto front surfaces, i.e., abutment surfaces oriented in the direction of the wheel rotation motion. The appendixes or ribs can be made with angular width adequate to ensure strength to the bending or breaking thereof and commensurate with the acting forces provided, without requiring structural and dimensional changes of the brake itself, but simply by changing the angular widths of the appendixes or the protrusions of the respective engaging seats, notches, recesses.

In addition, the shapes of the protrusions or ribs and respective seats are matching and such that the shape coupling is accurate and prevents relative clearances between disk and drum.

There are no complications from the construction point of view, since both the ribs and the recesses or engaging seats can be easily made without requiring particular machining. At the same time constitutive parts as clamping bots and respective threaded seats are avoided.

According to yet an advantageous characteristic that provides higher strength and stability, the central bearing between hub and drum is dimensioned such that the ratio between outer drum diameter and inner drum diameter is between 1.6 and 2.5, preferably between 1.8 and 2.1. Specifically it is about 2.

Yet still according to a further characteristic, the cover half-shell or half-shells have at least one front opening shaped as a funnel or conveying cone with the cone base forming an inlet of cruising air and which is closed by a grid, the cone or funnel having a protrusion in the direction of the rotation axis of the wheel and an angular extent between $5/12$ and $3/12$ of perigon, preferably equal to $1/3$ of perigon, while the remaining circular cover segment is made of a slot, preferably two air outlet slots which are closed by grids similarly to the inlet mouth of the cone or funnel.

According to an embodiment, the cone or funnel conveying the input flow has a base surface forming the inlet mouth of said flow which has an angular extent substantially equal to 120°, while the outlet slots have angular widths of 2000 overall, i.e., about 100° each.

According to yet still a characteristic, at least one or both the cover half-shells have a connecting member for the engine steering rods in the typical vintage motorbikes way.

These and other characteristics and advantages of the present invention will be more evident from the following description of some exemplary embodiments illustrated in the accompanying drawings wherein:

FIG. 1 and FIG. 2 respectively show the front view and the vertical section of the brake according to an embodiment of the known art.

Figure 1:
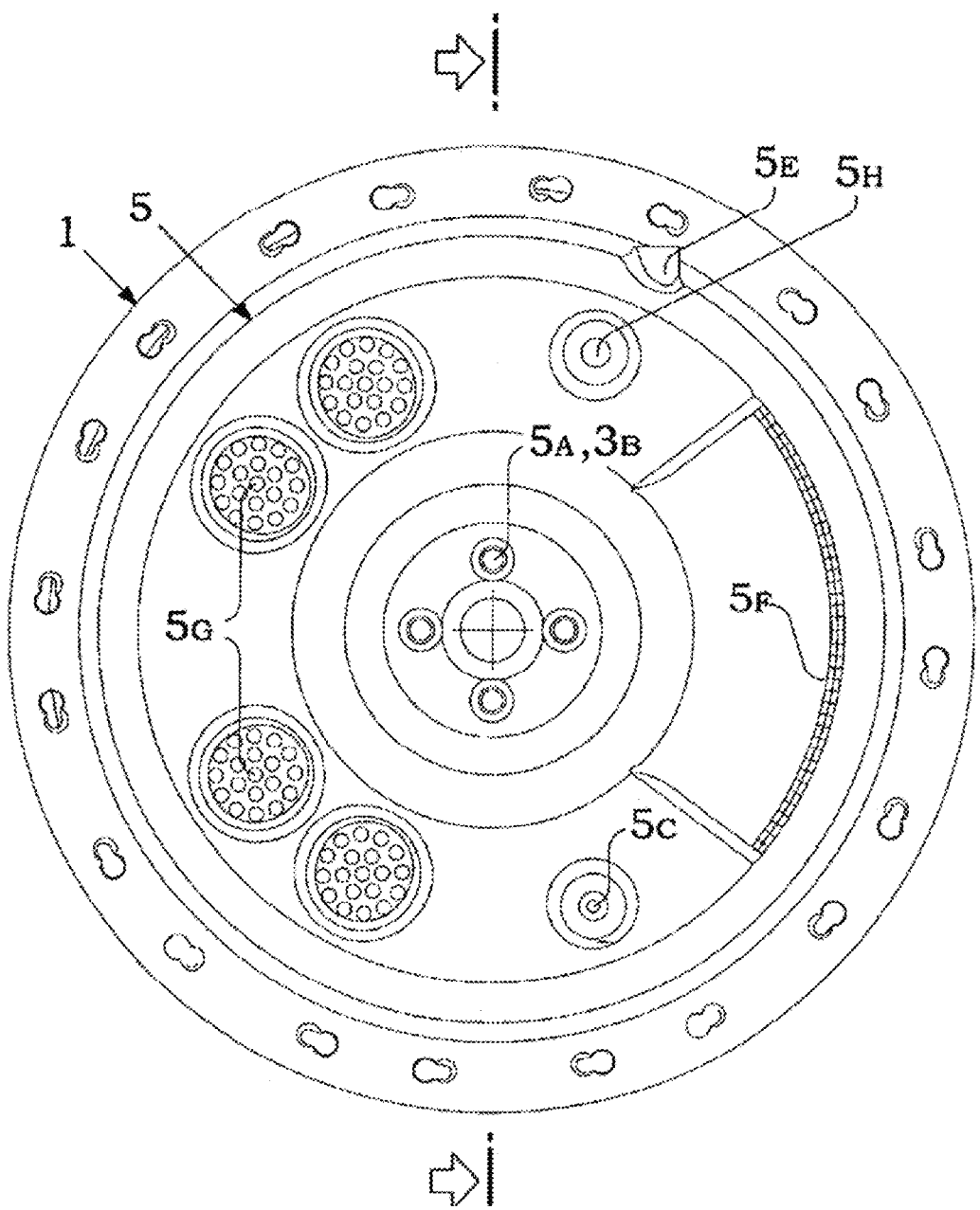
Figure 2:
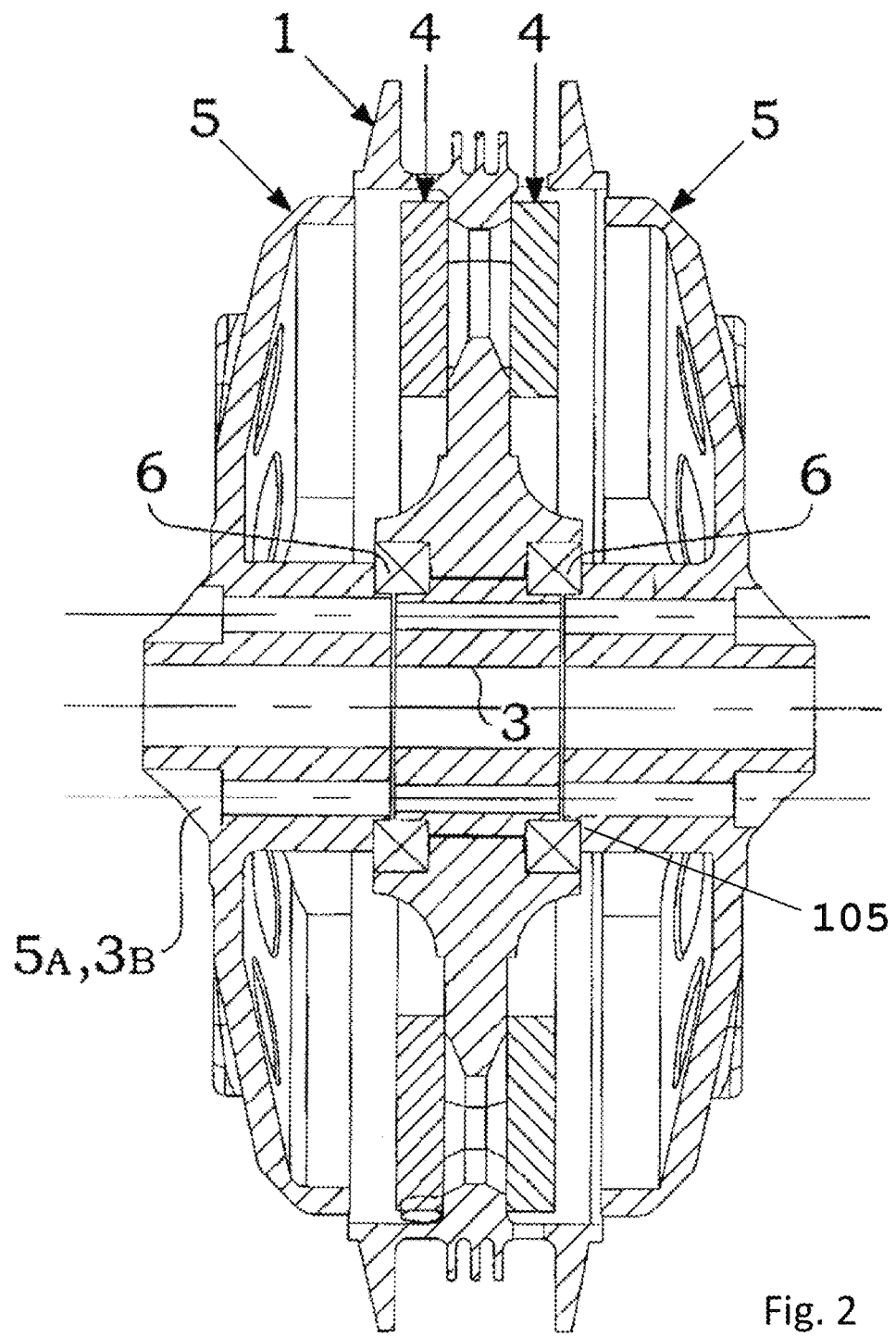

The examination of the accompanying drawings 1 to 11 that depict an embodiment according to the known art and starting from FIGS. 1, 2, 3 and 4, shows that the hydraulic brake in question comprises a central drum 1 that is coaxially mounted with the rim by means of a hub 3. The hub 3 is provided with proper bearings 6 positioned in side annular seats 3A and is keyed on the wheel rotation shaft, i.e., the hub, rim 10 and of course tire assembly.

Figures 5, 6:
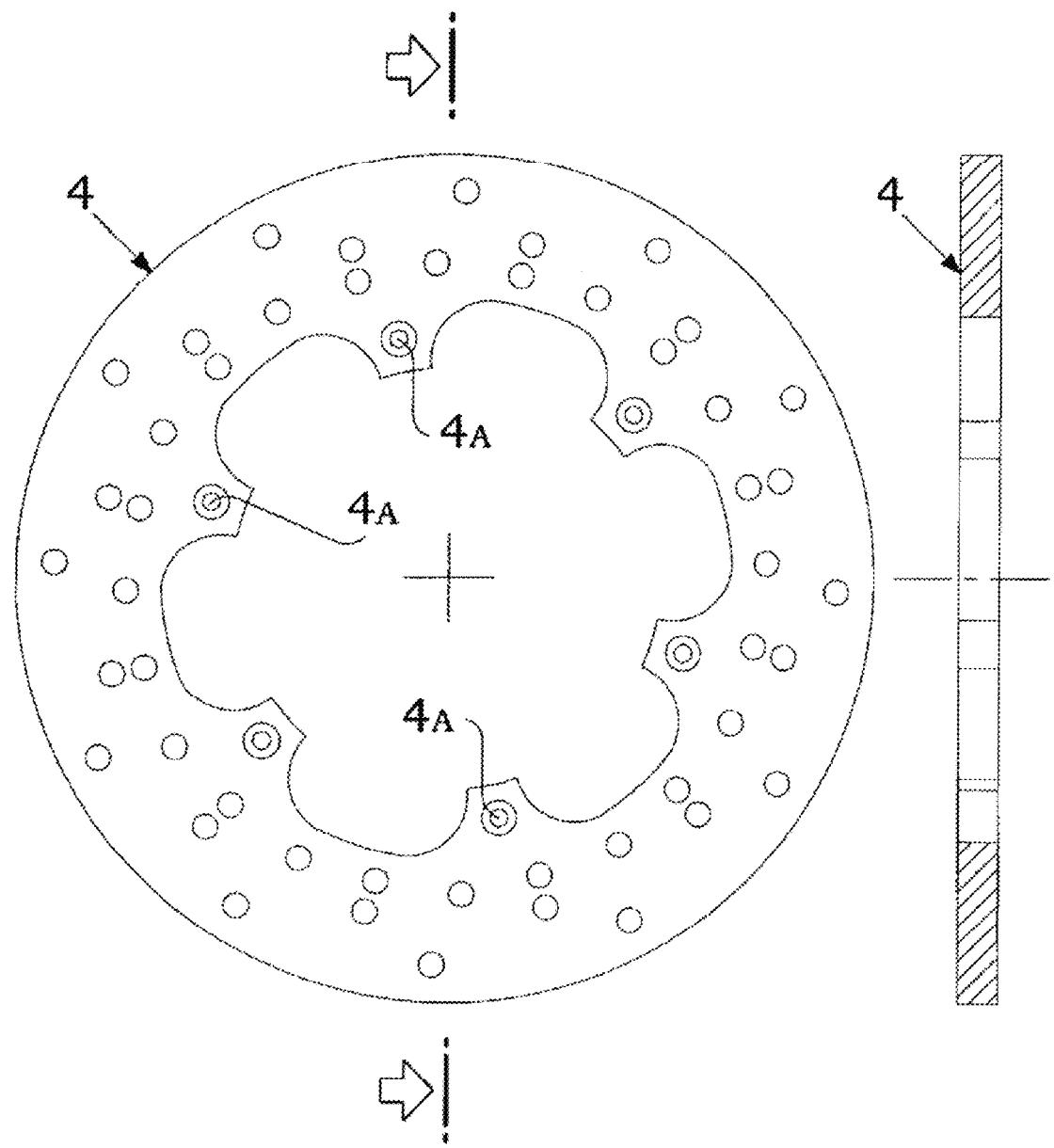
FIGS. 5 and 6 show, respectively, the front view and the vertical section of one of the brake disks according to the example of known art of the preceding figures.
Figures 7, 8:
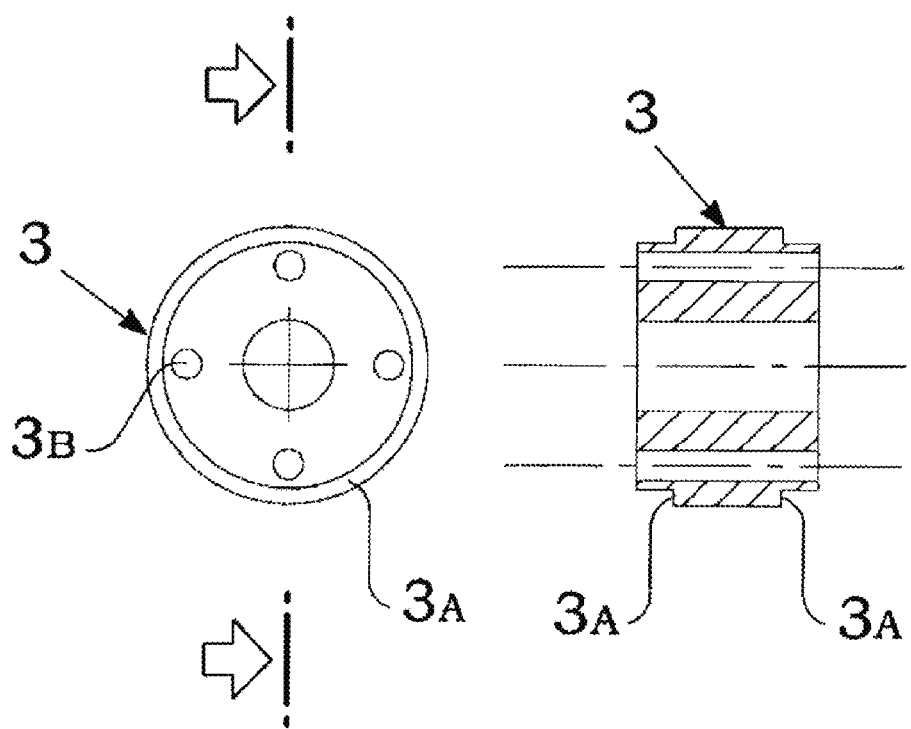
FIGS. 7 and 8 show, respectively, the front view and the vertical section of the brake hub according to the example of known art of the preceding figures.

The drum 1 has centrally a circular crown of threaded and through holes 1A, in order to fasten, on each face of the drum itself, a metallic disk 4 made of steel or cast iron. Said disks 4, FIGS. 5 and 6, are in turn provided with a corresponding crown of through holes 4A in order to be fastened to the drum 1 and thus rotate with the same integrally with the wheel, i.e., the rim on which the tire is mounted and forming the vehicle wheel with the same.

Figures 9, 10:
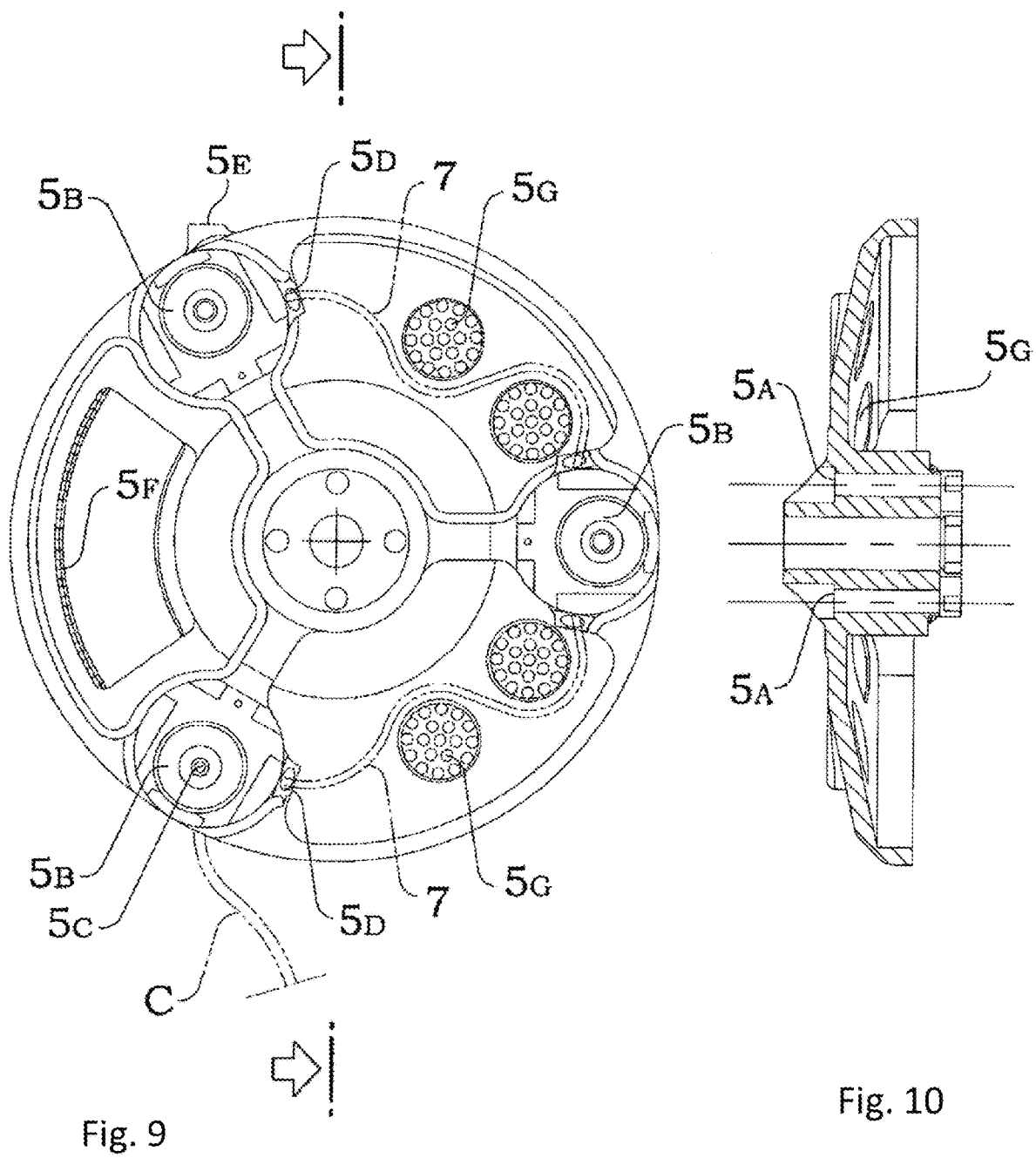
FIGS. 9, 10 and 11 show, respectively, the outer front view, a vertical section and the inner front view of the brake cover according to the example of known art of the preceding figures.
Figure 11:
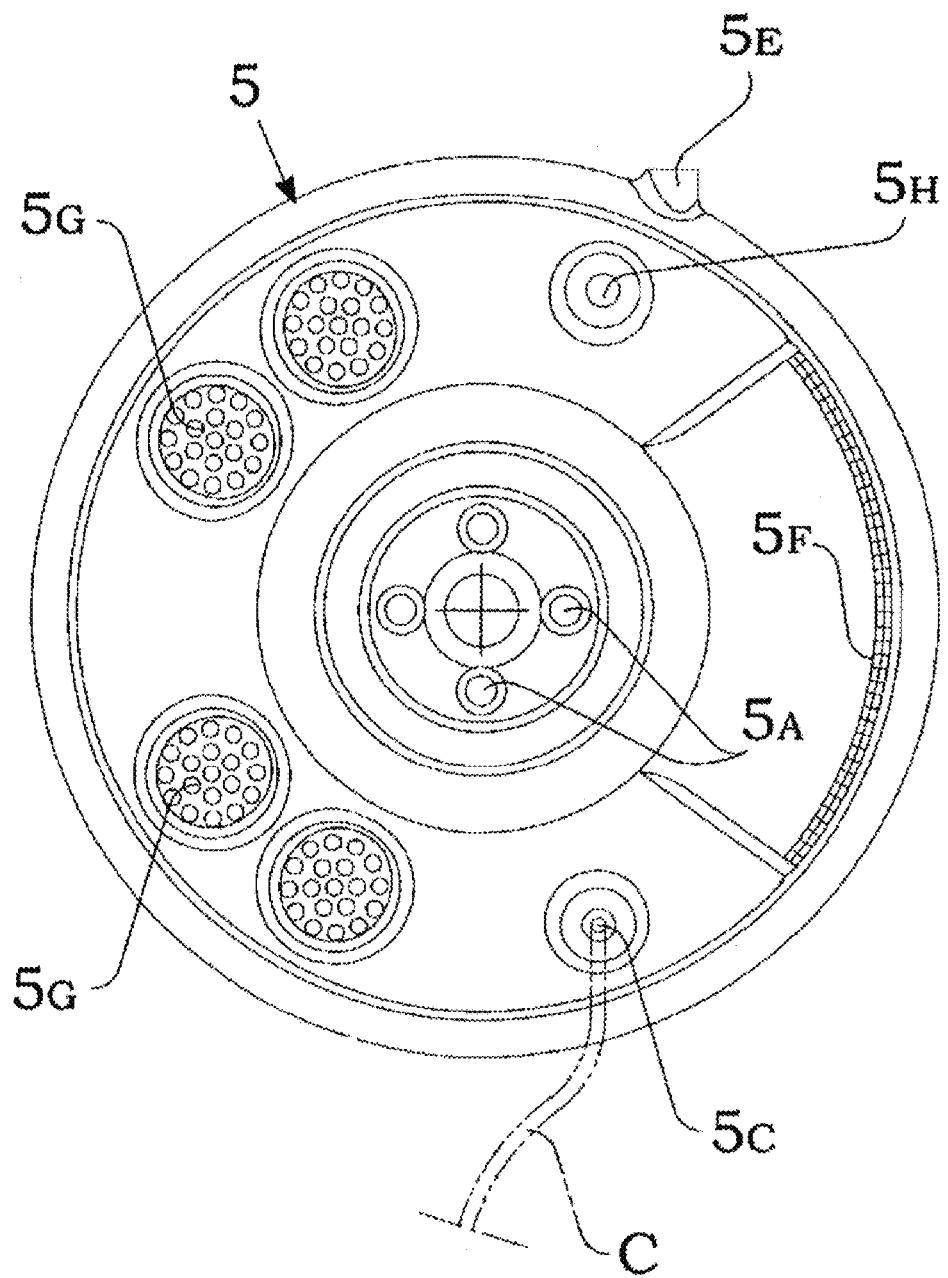

Two covers 5, as shown in FIGS. 9, 10 and 11, close respectively each one of the side faces of the drum 1 provided with the disks 4, said covers 5 being fastened by means of bolts engaged via through holes 5A of the covers that are matching with holes 3A of the central hub.

Bolt fastening occurs in the threaded holes 3a of the central hub. Said bolts lock on each side face of the hub 3 and drum 1 a corresponding bearing that remains tightened between two annular stepped facing recesses 3A, 101 aligned to one another of the hub 3 and drum 1 respectively for the outer ring and the inner ring of the bearing 6 and an annular side step of the cover 5 adhering to the radially innermost ring of the bearing 6.

This way the central hub 3 and the central hub 105 of the cover 5 can remain stationary with respect to the rotation of the drum 1 and wheel meant as rim, drum 1 and disk or disks 4 assembly.

Each cover 5 is provided inside with three cylindrical chambers 5B that positioned at 1200 are designed for housing as many brake pads of high friction material or braking elements inside. Each one of these brake pads can be pushed and compressed against the outer side face of the disk 4 by means of a pushing actuator that can be of any type and that is preferably composed of an actuator that is hydraulically driven by the brake lever, which acts mechanically on the plunger of a plunger cylinder unit filled with oil by conveying the lever action from this plunger cylinder unit to the plunger cylinder unit of each one of the pushing actuators of the braking element or brake pad.

A duct C connects this cylinder with one of the three chambers of each cover 5, i.e., with the chamber denoted by 5C.

The oil inlet hole 5C has an axis quite parallel to the axis of the cover 5.

This oil input chamber is connected to the other two by means of two ducts 7 that, dotted in FIG. 9, are applied in proper holes 5D made in the side surface of the same chambers 5B. The chambers are therefore filled with oil in succession and the compression of the braking elements occurs correspondingly. At the last chamber 5B in filling order, a hole 5E is made for the air outflow at oil entering the chambers.

In order to optimize said oil inflow and facilitate said air outflow, the two covers 5 are both mounted with the oil inlets holes 5C firmly positioned downwards and with the air venting holes 5E firmly positioned upwards, as in FIG. 1.

At the brake lever actuation, the oil input in the three chambers 5B of each cover 5 determines the displacement of corresponding little plungers housed in each chamber 5B that push the respective brake pads against the corresponding disk 4, thus exerting a braking action whose strength can be adjusted by the displacement of the brake lever on the handlebar.

In order to allow the brake cooling, an opening 5F provided with a grid is made on the side surface of the cover 5, while four further openings 5G provided with grids are made on the cover 5 on the rear half opposite that of the grid 5F. At mounting, the grids 5F are positioned facing forward in reference to the direction of travel, to allow the air input within the chamber closed by covers 5 and which air can flow out from the rear openings 5G, thus generating a cooling flow of the disks 4 and the brake pads.

An additional blind hole 5H, made on the outer surface of the cover 5, allows the engine steering rods to be connected, in the typical way of the vintage motorbikes.

It has to be added ultimately that, notwithstanding the rough features illustrated and described, the brake conceived can be susceptible of changes or variations however comprised in the present patent scope and that could for example relate to different dimensioning of the brake itself in accordance with the foreseen application, that could occur not only on motorbikes but also on cars.

The brake according to the present invention is a significant improvement of the brake according to the state of the art above described and shares many structural parts with the same, whereby the preceding description also applies for the brake according to the present invention. In FIGS. 12 to 15 the structural changes that differentiate the construction according to the known art from that according to the present invention and that have been highlighted in their more general embodiment in the introduction, will be essentially illustrated.

Figure 12:
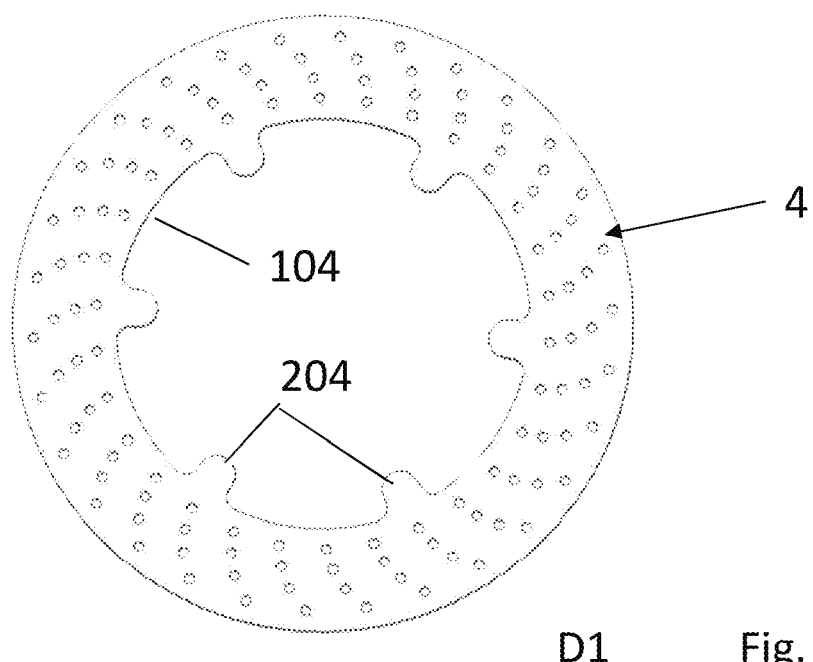
FIG. 12 shows a view in the direction of the central axis of the disk according to the present invention, wherein the same is made floating and is not tightened against the drum 1.
Figure 13:
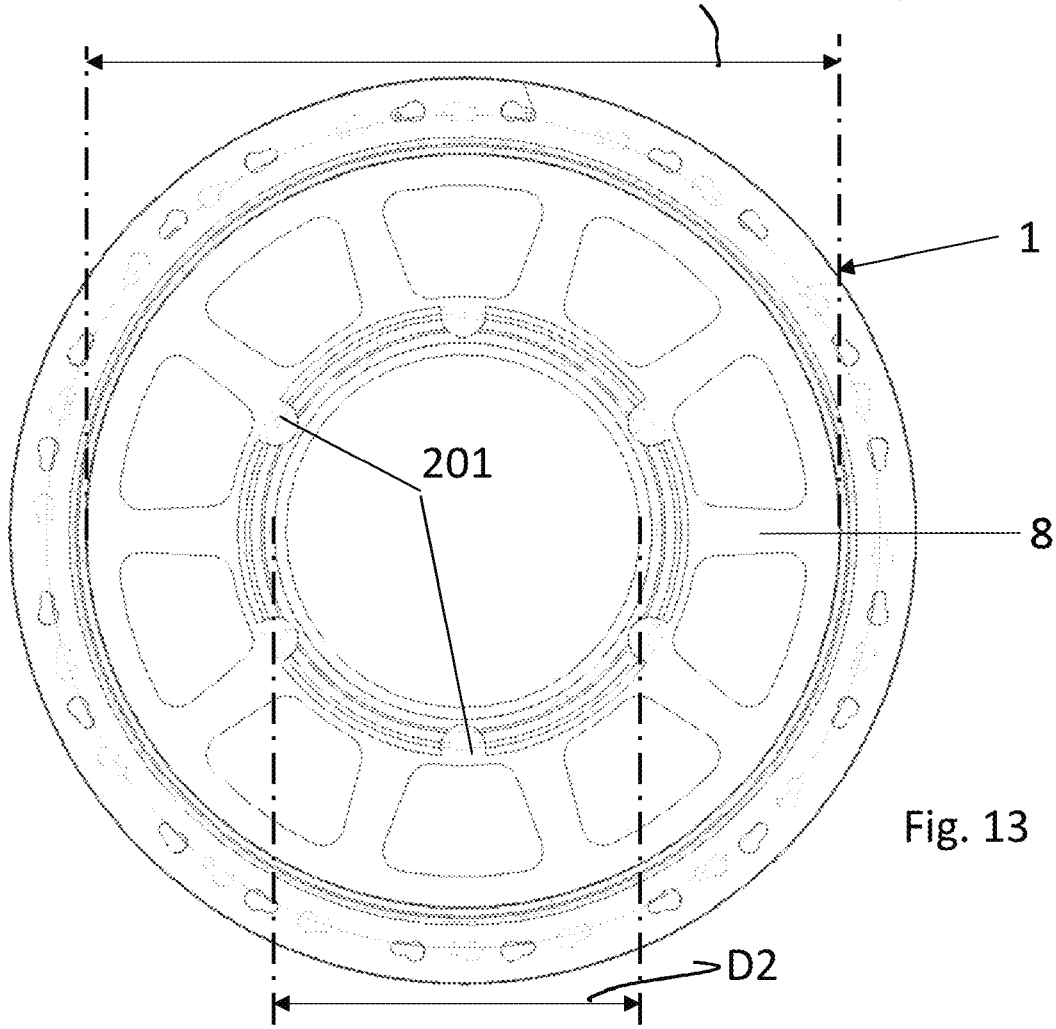
FIG. 13 shows a similar view on a side face of the drum 1 having rotary engagement recesses of the disk according to the present invention.

In reference to FIGS. 12 and 13, these show an exemplary embodiment of a disk 4 of the brake according to the present invention and the corresponding central drum 5.

As it is apparent the disk 4 has, along the inner peripheral edge 104, a crown of inner radial appendixes 204. These are arranged angularly equally spaced apart. The inner radial appendixes 204 have a predetermined extent in the circumferential direction and a predetermined radial protrusion. These quantities are defined upon the forces the appendixes are subjected to during the braking action, and the person skilled in the art is able to calculate a dimension thereof upon his basic technical knowledge. The drum 1 has, in coaxial position and along a circumference external to the stepped seat 101 for the bearing (not shown in FIG. 13), a corresponding crown of radial recesses 201 that have corresponding sizes, in number and relative corresponding position to the inner radial appendixes 204 of the disk.

As it is apparent according to an embodiment, the appendixes have a rounded end with semicircular pattern and similarly the bottom of the recesses 201 is made of a semicircular wall.

It is apparent that the strength of the appendixes-recesses coupling can be modulated without disrupting the configuration of the whole brake, but by simply changing the thickness of the appendixes 204 and thus the length of the recesses 201 along the circumferential direction.

Similarly, also the protrusion of said appendixes and the corresponding depth of the recesses can be modified within the limits of the possibilities provided by the tolerances of the drum construction.

It is also possible to easily change the number of the appendixes and recesses, thus modifying the strength of the coupling between disk and drum.

Advantageously the coupling of appendixes-recesses 204, 201 is an accurate shape coupling that prevents clearances, even if these are possible within predetermined tolerances.

Similarly to the embodiment of the known art, the disk or disks 4 rest against the surface of the central hub that consists of an area provided with two annular members connected by radial elements and having a constant thickness. This annular area of the drum 1 forms lightening undercuts for circulating air between the two disks 4. The backing surface 8 of the disk also extends to the area of the engaging recesses of the appendixes that, in addition to be engaged in the recesses in reference to the radial and circumferential direction, rest on the side bottom of said recesses, i.e., on the wall closing the same towards the central drum plane perpendicular to the rotation axis. This feature gives additional stiffness to the coupling among appendixes and recesses 204/201 to one another.

Figure 3:
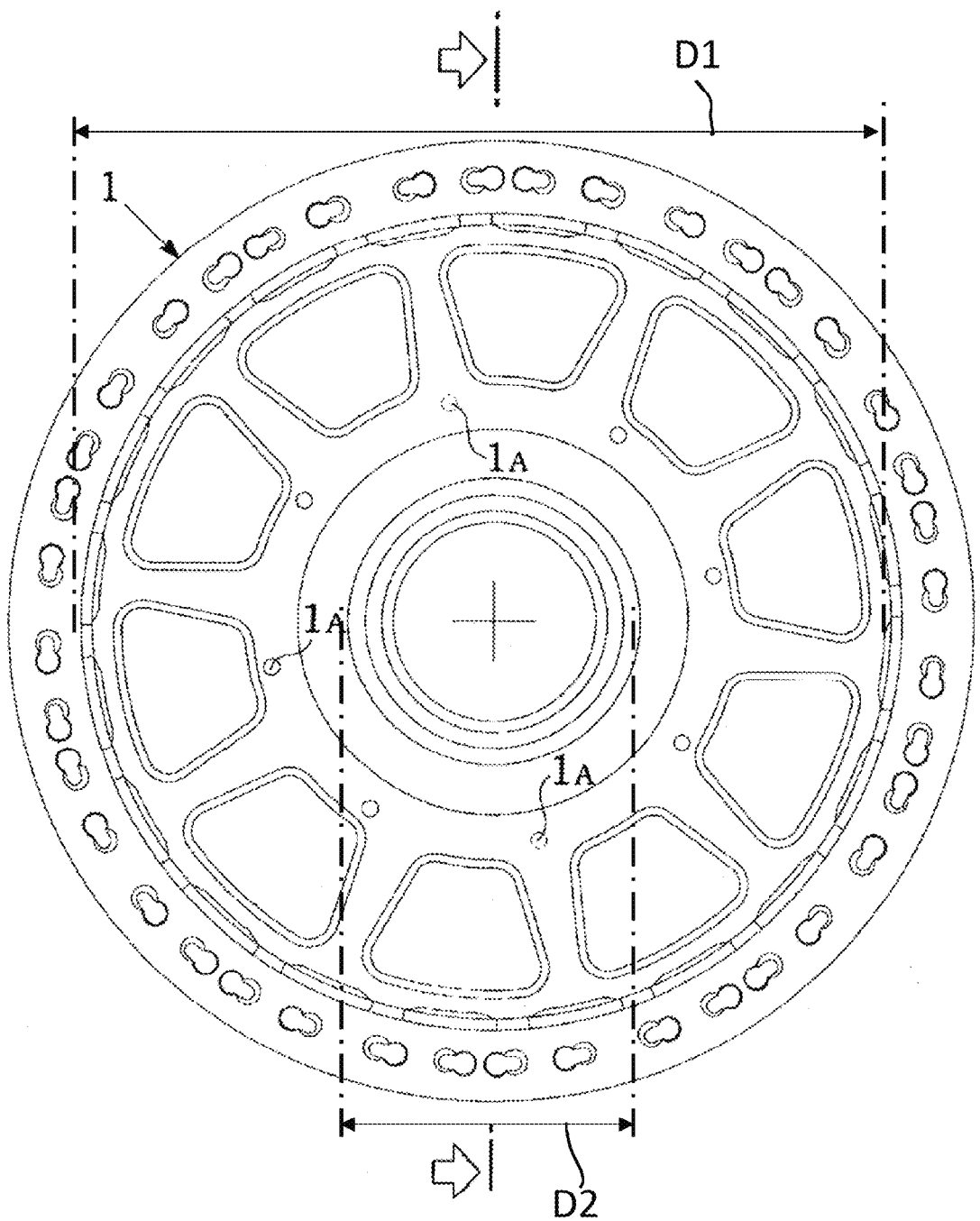
FIGS. 3 and 4 show respectively the front view and vertical section of the drum of the brake according to the preceding figures representing an embodiment of the known art.
Figure 4:
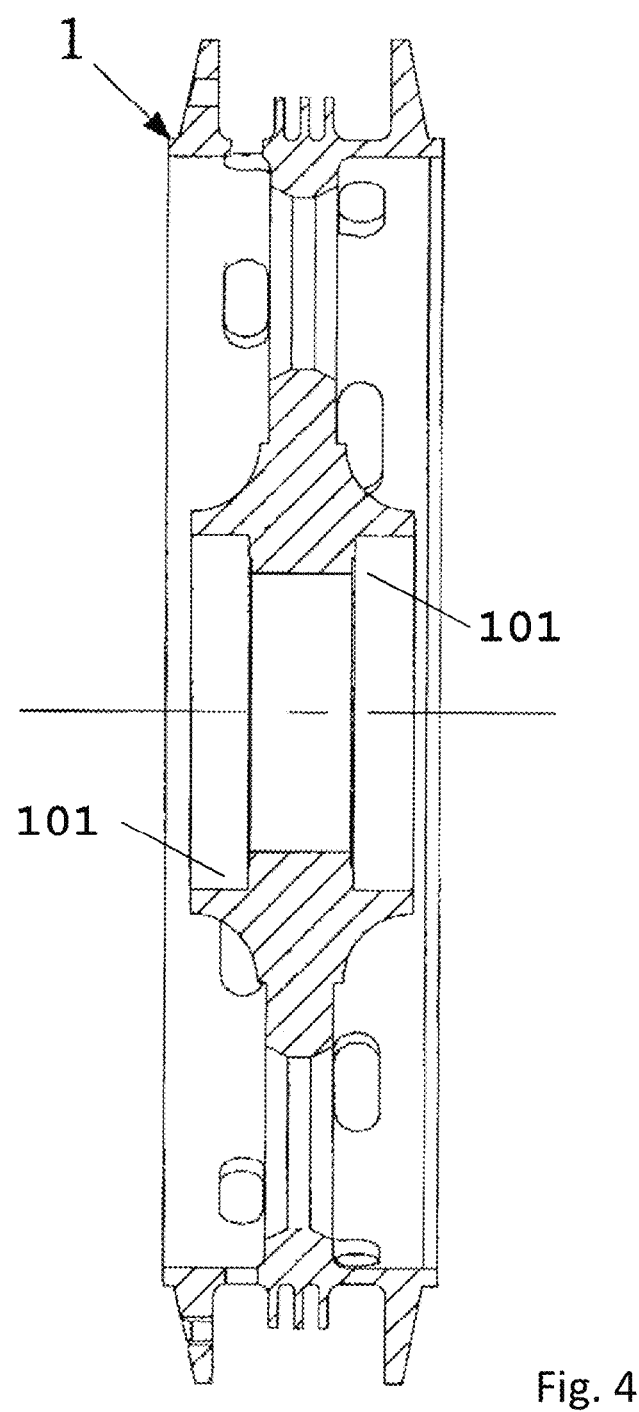

From FIG. 13 in combination with FIG. 3 that shows the embodiment according to the state of the art, it is apparent that in the embodiment of the present invention the drum is designed so as to be able to house a bearing and a central hub with a diameter larger than the outer diameter of the drum 1 itself.

In particular and advantageously, the best optimization configurations among the different contrasting requirements is to provide a ratio between outer diameter $D_1$ of the drum and inner diameter $D_2$ of the drum between 1.6 and 2.5, preferably between 1.8 and 2.1. In particular in the embodiment illustrated, said ratio $D_1/D_2$ is about 2.

Figure 14:
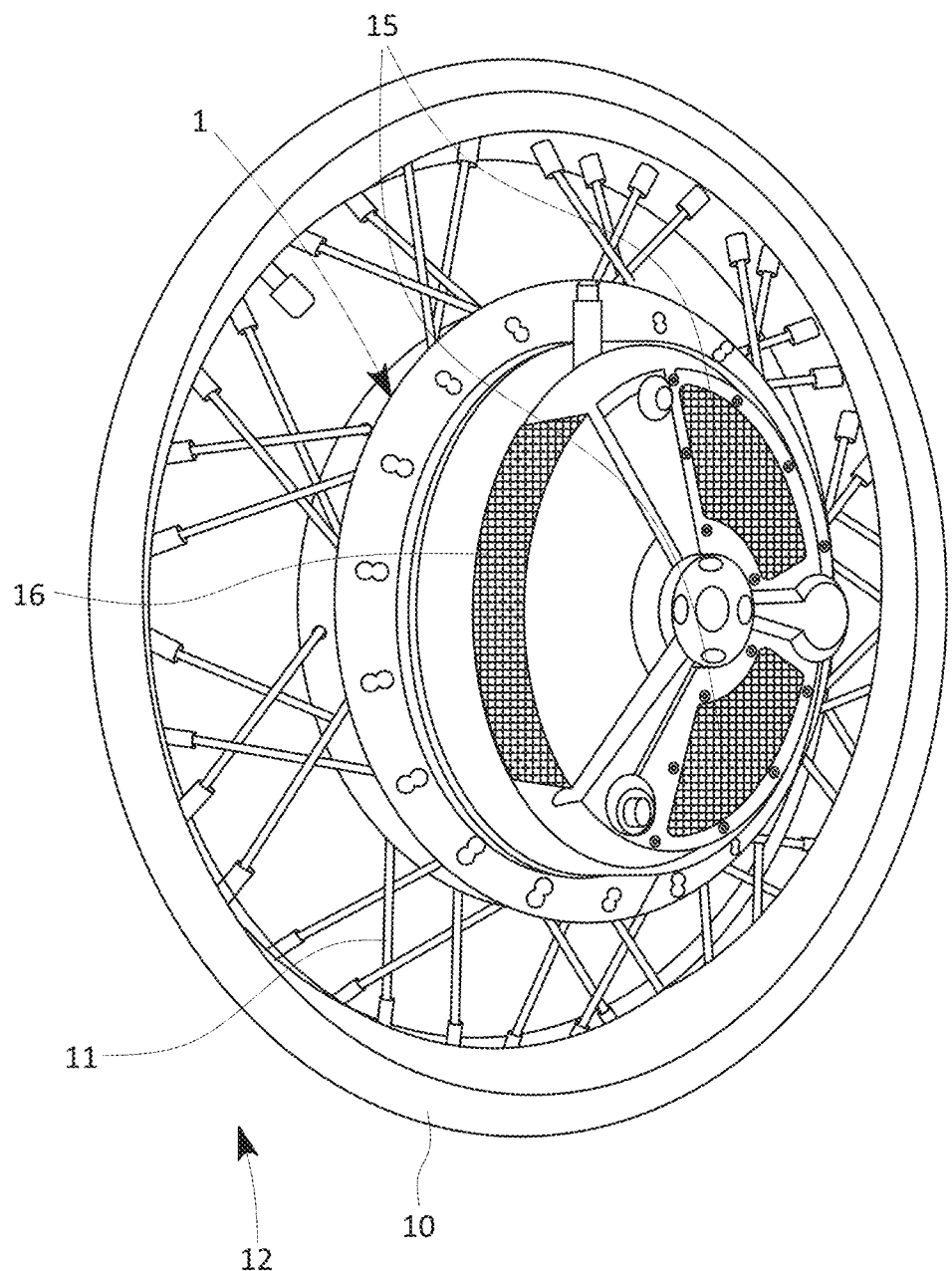
FIG. 14 shows a wheel with a brake according to the present invention.
Figure 15:
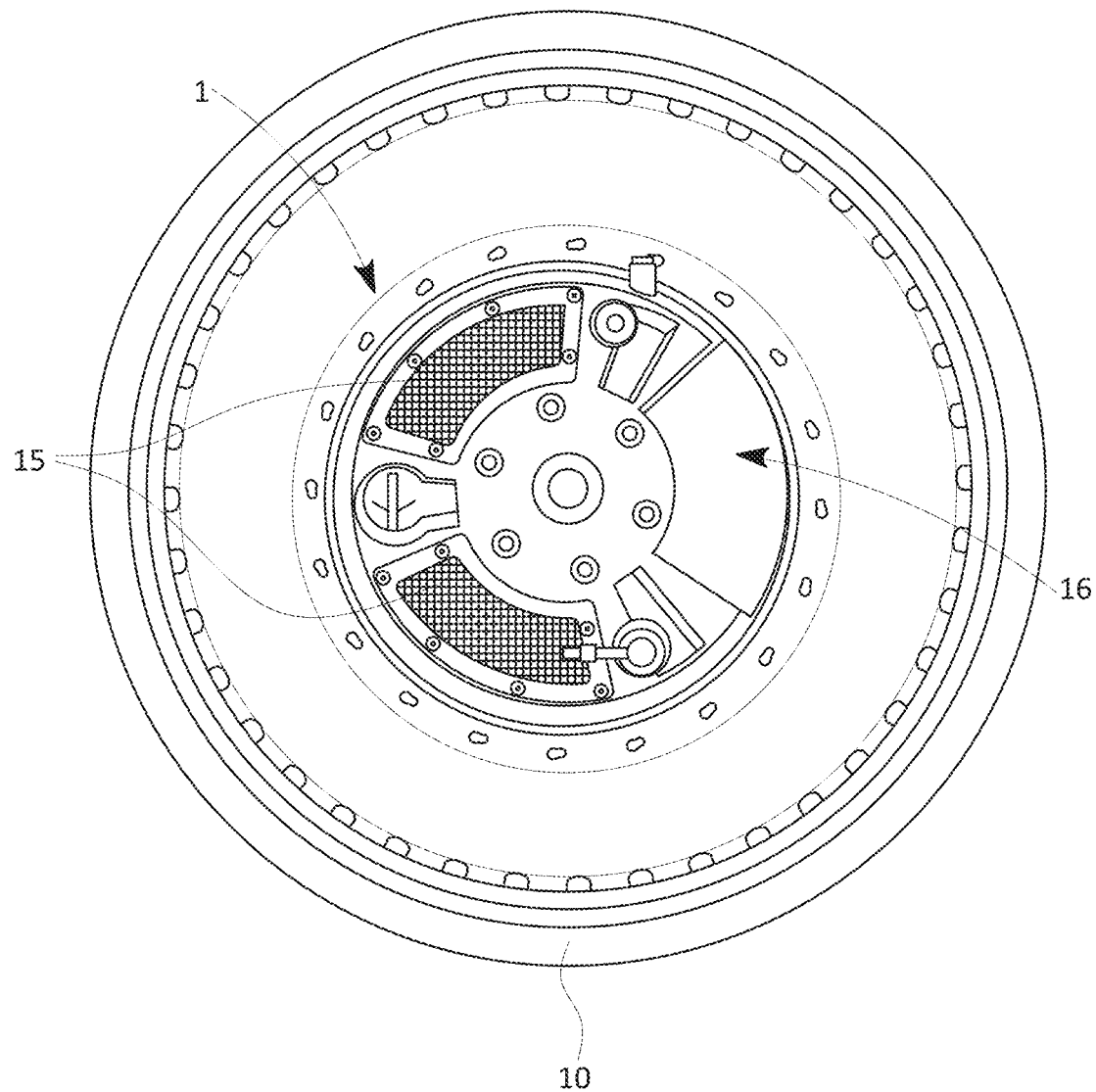
FIG. 15 shows the combination of rim and brake according to the present invention, wherein the spokes connecting the rim to the hub have been omitted.

FIGS. 14 and 15 show the brake according to the present invention mounted with a rim 10 thanks to the spokes 11 and which rim carries a tire 12 such to form a car wheel.

FIG. 15 shows instead in the correct position a view in the direction of the rotation axis of the combination of rim and brake, the connecting spokes being omitted.

As it is apparent from the figures, the embodiment of the present invention provides outlets for the flow of the cooling air of the disk or disks, which have larger size as depicted by the openings provided with grids 15.

Furthermore, also the opening of the cone or funnel of the front air inlet 16 is made increased in size.

The embodiment variations of the embodiments shown in FIGS. 14 and 15 show that the width of the openings varies within the following ranges of angular extent:

the cone or funnel 16 has a protrusion in the direction of the rotation axis of the wheel and an angular extent between $5/12$ and $3/12$ of perigon, preferably equal to $1/3$ of perigon, whereas the remaining circular cover segment is made of a slot, preferably two air outlet slots which are closed by grids similarly to the inlet mouth of the cone or funnel.

According to an embodiment, the cone or funnel conveying the input flow has a base surface forming the inlet mouth of said flow which has an angular extent substantially equal to 120°, while the outlet slots have angular widths of 200° overall, i.e., about 100° each.

From the preceding description, it is apparent that the device according to the present invention can be applied mutatis mutandis to rims made of a central drum that connects with a peripheral ring by means of spokes or other radial elements. In the shaped rims made of an aluminum material, the disk housing can be made and the peripheral indentations can be made in a single piece with the rim, i.e., by die casting.

According to some variations in addition to what is set forth above, said rims can be made of die-cast aluminum. Such a possibility allows reducing the manufacturing and installation costs of a car.

The invention claimed is:

1. A vehicle brake comprising:
   a disk;
   a central drum of a wheel, the central drum being rotationally integral with the disk and rotatingly supported on a shaft, the central drum forming, for the disk, a half-shell of a housing compartment composed of two half-shells separated from one another along a plane parallel to a plane subtended by said disk; and
   a cover half-shell provided on a disk side opposite the central drum, the cover half-shell closing said housing compartment on the disk side opposite said central drum, said cover half-shell being provided with a braking element compressible by a hydraulically operated pushing system against a first face of the disk by operation of a braking control member, the cover half-shell being non-rotatingly supported with respect to the central drum,
   wherein said disk comprises a crown of teeth or radial ribs engaging a concentric crown of radial engaging recesses on said central drum,
   wherein said central drum comprises a backing surface which supports at least part of said teeth or radial ribs and at least part of a second face of the disk facing towards said central drum, and
   wherein the backing surface of the central drum provides a countercheck of the disk against a compressing action of the braking element against the first face of the disk.

2. The vehicle brake according to claim 1, wherein the cover half-shell carries at least three braking members which are arranged angularly at an equal distance from one another in reference to a disk symmetry axis.

3. The vehicle brake according to claim 2, wherein the cover half-shell is internally provided with at least three pushing systems, each pushing system comprising a cylindrical chamber configured to house internally as many brake pads of friction material or braking elements and a pushing actuator plunger, a duct providing fluid communication between a brake oil reservoir and one of the three cylindrical chambers.

4. The vehicle brake according to claim 3, wherein the at least three pushing members, or brake pads or the braking elements against the disk, are serially connected and in succession one to another to receive pressure fluid in temporal succession from one to another one.

5. The vehicle brake according to claim 3, wherein the one of the cylindrical chambers, to which the brake oil is fed, is positioned lower in reference to a condition of normal use of a wheel, is a last one of the three pushing members receiving the brake oil, and is provided with an air venting opening.

6. The vehicle brake according to claim 1, wherein the central drum is rotatably mounted with interposition of at least one bearing on a stationary central hub, which is arranged to be stationarily supported on the shaft, the cover half-shell being fastened to said central hub such to not be rotatable around a rotation axis of the central drum and rotationally unconstrained from said central drum.

7. The vehicle brake according to claim 1, wherein the central drum carries a substantially identical disk on each of its faces, the central drum being made symmetrical with respect to a central plane perpendicular to a rotation axis, the housing compartment for the corresponding disk being provided on each face of said central drum closed outwardly by an identical cover half-shell, so as to provide two cover half-shells.

8. The vehicle brake according to claim 7, wherein the two cover half-shells are disposed to be symmetrical to one another with respect to said central plane perpendicular to the rotation axis of the central drum.

9. The vehicle brake according to claim 1, wherein the central drum is annularly shaped, and wherein a central bearing between a hub and the central drum is dimensioned such that a ratio between an outer diameter of the central drum and an inner diameter of the central drum is between 1.6 and 2.5.

10. The vehicle brake according to claim 1, wherein the cover half-shell has a front opening shaped as a funnel or a cone with a cone base forming an inlet of cruising air, the opening being closed by a grid, the cone or funnel having a protrusion in a direction of a rotation axis of a wheel and with a solid lateral wall extending between 900 and 150°, one or more remaining lateral wall segments being made as one or more slots closed by one or more grids.

11. The vehicle brake according to claim 10, wherein the funnel or the cone has a base surface forming an inlet mouth for an input flow, the inlet mouth having an angular extent substantially equal to 120°, the one or more slots each having an angular width of about 100°.

* * * * *